United States Patent [19]

Rondeaux et al.

[11] 4,099,953
[45] Jul. 11, 1978

[54] INSTALLATION FOR HEATING STARTING MATERIALS FOR GLASS MELTING

[75] Inventors: Louis Rondeaux, Velaines; Jules Legrand, Brussels, both of Belgium; Claude Baelde, Saint-Germain en Laye, France

[73] Assignee: Polysius AG, Neubeckum, Fed. Rep. of Germany

[21] Appl. No.: 850,087

[22] Filed: Nov. 10, 1977

[30] Foreign Application Priority Data

Nov. 12, 1977 [BE] Belgium ............................ 848251

[51] Int. Cl.² .................................... C03B 5/16
[52] U.S. Cl. ........................ 65/335; 65/27; 65/134; 165/104 F
[58] Field of Search ............ 65/27, 134, 135, 136, 65/335; 165/104 F

[56] References Cited

U.S. PATENT DOCUMENTS

| | | | |
|---|---|---|---|
| 2,629,938 | 3/1953 | Montgomery | 165/104 F X |
| 3,299,947 | 1/1967 | Boucraut et al. | 165/104 F |
| 3,510,289 | 5/1970 | Boivent | 65/335 |
| 3,907,956 | 9/1975 | Meunier | 65/134 X |
| 3,944,713 | 3/1976 | Plumat et al. | 65/134 X |

*Primary Examiner*—Arthur D. Kellogg
*Attorney, Agent, or Firm*—Jones, Thomas & Askew

[57] ABSTRACT

An installation for heating starting materials intended for the melting of glass includes a melting furnace and a preheater for the starting materials which is arranged downstream of the melting furnace and to which a pipe is connected for from the melting furnace introducing the hot residual gases from the furnace.

15 Claims, 2 Drawing Figures

INSTALLATION FOR HEATING STARTING MATERIALS FOR GLASS MELTING

BACKGROUND OF THE INVENTION

In the glass industry, a relatively large amount of thermal energy is consumed in the melting of the starting materials of the glass in the melting furnace. Unfortunately, the efficiency of the melting furnaces is relatively poor because the temperature of the residual gases from these furnaces is determined by the melting temperature of the glass or its starting materials. Accordingly, various attempts have been made to improve the overall efficiency of these melting installations.

In practice, therefore, recuperators for example are connected to the melting furnaces, these recuperators generally comprising two chambers which are lined with bricks accumulating the heat and, hence, stacked and which operate in an alternately periodic manner so that one of the chambers is traversed for a predetermined period of time by the residual gases from the furnaces (which thus heat the bricks) to be removed through the chimney, whilst cold fresh air simultaneously flows through the second chamber and is heated to act as combustion air for the melting furnace. Under these conditions, therefore, one of the recovery chambers is on each occasion heated in an alternately periodic manner by the residual gases from the furnace at the same time as these residual gases give off some of their thermal energy (to the bricks) and are slightly cooled, whilst cooling of the heated bricks and simultaneous reheating of the combustion air take place in the second chamber conjointly with the operations mentioned in the first place. Apart from the fact that a constant cyclic inversion of the chambers of the recuperator modifies the combustion temperature of the melting furnace, it has been found that efficiency cannot reach the required level.

In other known installations, the melting furnace is preceded by a vessel which is intended for preheating the starting materials and into which the residual gases emanating from the melting furnace are introduced and utilised to the maximum for preheating the starting materials. Unfortunately, it has been found that, in this case, too, the thermal efficiency is still inadequate because, in addition to this deficiency, there is a further disadvantage that these preheaters operate inadequately in the event of a different grain size distribution of the particles in the sense that the fine particles of dust are partly drawn off, and the starting materials leaving the preheater frequently have a composition entirely different from that which they have on entering the preheater. Accordingly, these known heating installations are relatively expensive with regard to the required efficiency level which is still relatively low.

SUMMARY OF THE INVENTION

Under these conditions, the problem which the present invention seeks to solve is to provide an installation of the type described above which, by comparison with known installations, is characterised in particular by its improved utilisation of the thermal energy of the residual gases of the furnace and by favourable overall dimensions, the composition of the starting materials leaving the preheater largely corresponding to that of the starting materials entering the preheater in regard to the particle size distribution of their constituent particles.

According to the invention, this problem is solved by virtue of the fact that a fluidised-bed preheater provided with a discharge lock is used as the preheater for the starting materials and by virtue of the fact that a high-performance dust remover, of which the dust extraction pipe is connected to the discharge lock of the fluidised bed, is connected to the residual gas pipe of the fluidised-bed preheater.

By virtue of the use of the fluidised-bed preheater, it is possible to heat the starting material introduced into the preheater in an extremely uniform manner by favourably utilising the thermal energy of the residual gases recovered from the furnace. The fine particles of dust entrained by the residual gases of the fluidised-bed preheater may be almost completely collected by means of a high-performance dust remover, these fine particles of dust separated from the residual gases intended for the preheater subsequently being directly introduced, by virtue of the embodiment of the invention, into the discharge lock of the fluidised bed which reliably isolates the fluidised bed from the discharge of the starting materials. Accordingly, in the installation according to the invention, there is virtually no loss of particles from the composition of the starting materials such as is present on entry into the fluidised bed and, on leaving the preheater, the starting materials have substantially the same composition of particle sizes as that with which they enter the fluidised-bed preheater.

It should also be mentioned here that the starting materials to be introduced into the preheater are preferably subjected to an extracting operation beforehand to separate for example the relatively coarse fragments of glass and other constituents which do not have to be preheated, and to introduce them separately into the melting furnace, as is already the case in practice.

In a heating installation comprising a recuperator traversed by the residual gases from the furnace and preheating the combustion air intended for the melting furnace, it is of particular advantage in accordance with the invention for the pipe carrying the residual gases from the furnace to connect the fluidised-bed preheater to the recuperator. By virtue of this arrangement, the hot residual gases emanating from the melting furnace which, in general, are too hot for preheating the starting materials, are also utilised first of all in the recuperator for preheating the combustion air intended for the melting furnace and are only delivered thereafter to the fluidised-bed preheater, thereby resulting in particularly *utilisation of the thermal *high energy of the residual gases of the furnace and, hence, in a considerable improvement in the efficiency of the installation according to the invention in relation to conventional installations.

BRIEF DESCRIPTION OF THE DRAWING

The invention is described in detail in the following specification, with reference to two examples of the embodiments illustrated, wherein.

DETAILED DESCRIPTION

Figure 1:
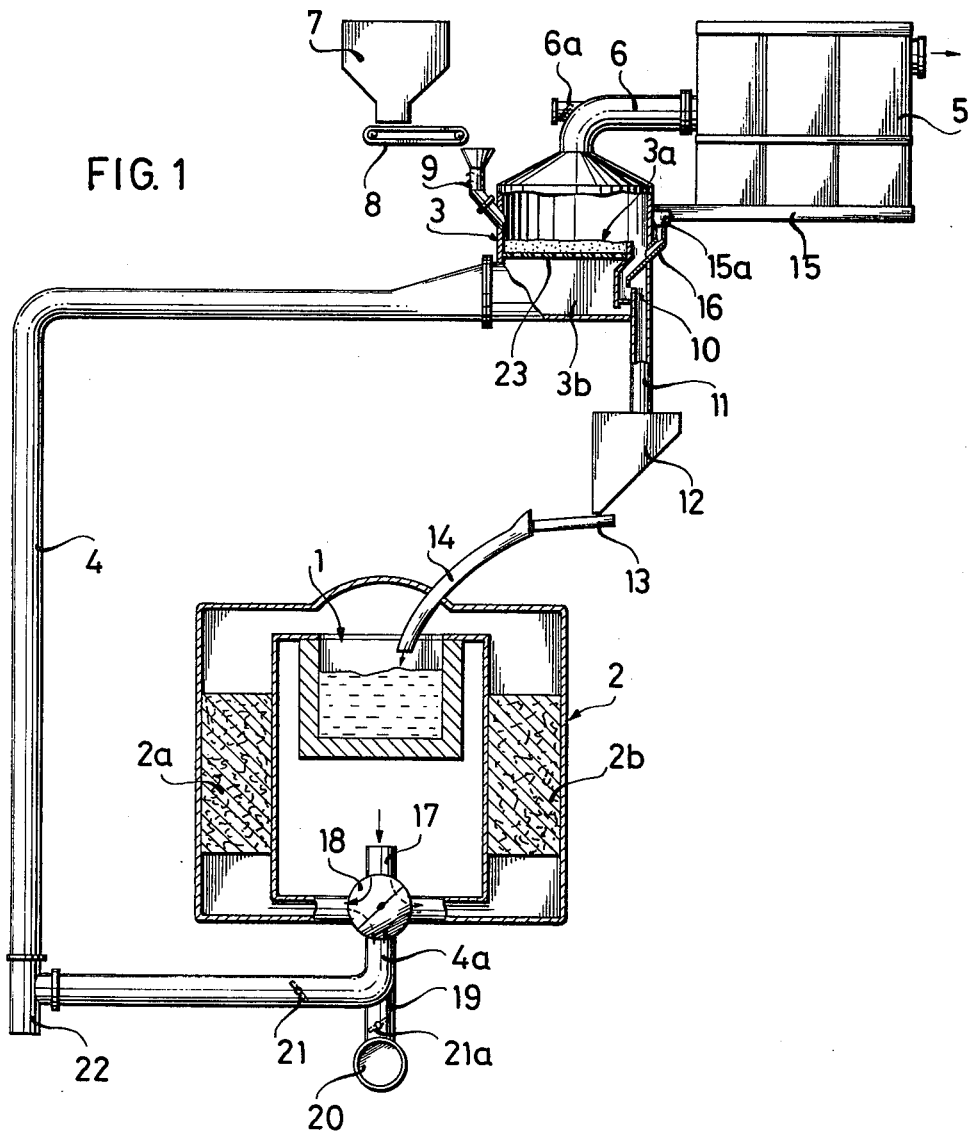
FIG. 1 is a shcematic elevational view of the installation, with parts shown in cross section; and, FIG. 2 is a schematic elevational view, similar to FIG. 1, but illustrating an alternate embodiment of the installation.

The first example of embodiment of the heating installation according to the invention, which is illustrated in FIG. 1, comprises a furnace 1 used for melting starting materials suitable for the production of glass, a recuperator 2 traversed by the residual gases from the furnace and preheating the combustion air of the melting furnace, a fluidised-bed preheater 3 connected to a pipe 4 for introducing the residual gases from the furnace and a high-performance dust remover 5 which is connected to the fluidised-bed preheater by the residual gas pipe 6 thereof. For the cold starting materials to be introduced into the fluidised-bed preheater 3, there is provided a feed hopper 7 below which is a suitable metering unit 8 (in this case a feed regulating conveyor for example) which is connected to the entrance lock 9 for the starting materials (for example a double-valve lock) of the fluidised-bed preheater 3.

According to the invention, the starting materials leave the fluidised-bed preheater 3 through a discharge lock 10 of the fluidised bed which is connected by a branch pipe 11 to an intermediate reservoir 12 receiving the preheated starting materials and below the outlet of which there is a tapping unit 13 which is preferably designed for metering the starting materials and which is connected to the melting furnace 1 by an overflow, a spout or similar element 14.

The high-performance dust remover 5 is formed by a bag filter or by any other suitable filter which reliably guarantees substantially complete separation of the fine particles entrained from the residual preheating gases. For the fine particles separated, the filter 5 comprises and endless collecting screw 15 of which the discharge nozzle 15a is connected by a junction pipe 16 to the discharge lock 10 of the fluidised bed. The residual gas pipe 6 of the fluidised-bed preheater 3 is provided with and adjustable cold air intake 16a.

In this first example of embodiment (FIG. 1), the recuperator 2 which is arranged immediately downstream of the melting furnace 1 is a conventional recuperator comprising two chambers 2a and 2b of which each is traversed in an alternately periodic manner by the hot residual gases of the furnace and by the combustion air which is introduced as cold air through an inlet tube 17 and which is preheated in each of the corresponding chambers 2a and 2b before being released to the furnace or to its burner. For periodically inverting the flows of combustion air and residual gases of the furnace, there is provided in the branch pipe, between the two chambers 2a and 2b of the recuperator, a multiple-way valve 18 to which are additionally connected the inlet tube 17 and the end 4a of the pipe 4 for introducing the residual gases from the furnace.

In addition, a branch pipe 19 connected to a chimmney 20 opening into the atmosphere is preferably provided at the end 4a of the pipe 4 for introducing the residual gases of the furnace. In order to be able if necessary to discharge into the atmosphere a controllable quantity of residual gases from the furnace, throttle valves 21, 21a are incorporated at suitable places in the branch pipe 19 and in the conduit 4 for introducing the residual gases from the furnace.

In view of the fact that, in the embodiment shown in FIG. 1, the residual gases from the furnace have already undergone cooling to a certain extent in the recuperator 2, a fan 22 may be incorporation in the pipe 4 for introducing the residual gases from the furnace, by means of which the residual gases may arrive under the necessary pressure at the grid 23 of the fluidised-bed preheater 3 and at the discharge lock 10 of the fluidised bed.

With regard to the construction of the fluidised-bed preheater 3, it is also pointed out that, to be complete, the preheater preferably has only one chamber 3a for the fluidised bed and is in the form of a chute by which the starting materials to be preheated are uniformly transferred from the entrance to the exit in an adequately fluidised state. It is of course also possible in accordance with the invention to use suitable fluidised-bed preheaters having different constructions, and constructions comprising several fluidised-bed chambers may optionally be used.

The mode of operation of the example of embodiment of the heating installation described above is explained in detail in the following. The starting materials intended for the melting of glass leave the feed hopper 7 in metered form to arrive at the fluidised-bed preheater and flow in a uniformly fluidised state from the entrance to the exit, as already mentioned above, during their preheating at the same time as they are discharged from the preheater through the discharge lock 10 of the fluidised bed without any stray air being able to enter the fluidised-bed preheater 3 at this point. In this discharge lock of the fluidised bed, the fine particles entrained by the residual gases from the preheater and separated in the filter 5 are also mixed simultaneously and uniformly with the remaining starting materials so that the preheated starting materials arriving at the intermediate reservoir 12 have substantially the same composition of particle sizes as that which they had on entering the fluidised-bed preheater 3. From this intermediate reservoir 12, the preheated starting materials may arrive in uniformly metered form at the melting furnace 1 by way of the tapping unit 13.

As already mentioned, the residual gases emanating from the melting furnace 1 are delivered in an alternately periodic manner towards one of the two chambers 2a and 2b of the recuperator 2 where they give off a first part of their thermal energy for preheating the combustion air of the melting furnace. The residual gases required for preheating the starting materials are delivered through the pipe 4 (their delivery being assisted by the fan 22) to the fluidised-bed preheater 3, i.e., into its pressure chamber 3b situated below the grid 23 in order to impart a fluidised state to the starting materials deposited onto the grid 23, to transfer them to the exit 10 and thus to reheat them in the desired manner. The residual gases flowing upwards in the chamber 3a of the fluidised bed then arrive at the filter 5 in the described manner. Cold air may optionally be introduced into the air issuing from the preheater through the connecting pipe 6a (in particular when the components of the filter 5 are in danger of deteriorating under the effects of the temperature of this issuing air).

In conventional embodiments equipped with recuperators having two chambers, necessarily cyclic variations in the temperature of the combustion air of the melting furnace are observed on account of the periodic inversion of the two chambers, corresponding variations in temperature of the residual gases leaving the chambers thus occurring at the same time. If the operation of the fan 22 incorporated in the pipe 4 for introducing the residual gases from the furnace remains unchanged, the heating temperature of the starting materials is thus adapted to that of the residual gases introduced and the result is that, for example, the starting materials entering the melting furnace are proportionally hotter when the combustion temperature is relatively low, which means that a temporarily lower preheating of the combustion air to be introduced into the melting furnace (and thus a temorarily lower combustion) is compensated by intense preheating of the starting materials so that the operation of the melting furnace is thus regulated in a predominantly automatic manner.

Figure 2:
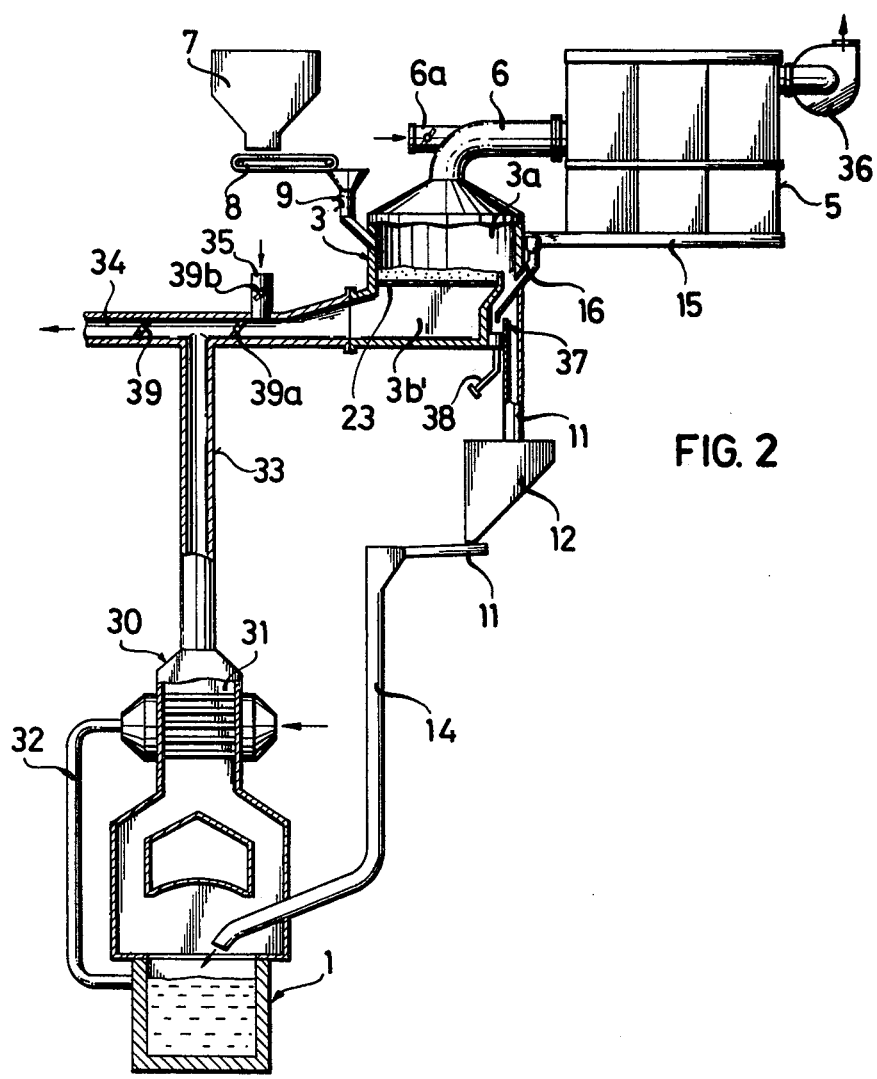

FIG. 2 shows a second example of embodiment of the heating installation according to the invention of which some points are slightly modified in relation to the first example of embodiment (FIG. 1). In FIG. 2, components identical with those of FIG. 1 are denoted by the same reference numerals so that there is no need for them to be described in order to avoid repetitions.

The main difference of this second example of embodiment lies in the fact that the recuperator 30, traversed by the residual gases from the furnace and preheating the combustion air of the melting furnace 1, is designed in the form of an indirect-action tubular heat exchanger through which the hot residual gases emanating from the melting furnace 1 pass in a constant, uniform manner (without any inversion) and are then delivered to a tubular system 31 which is traversed by the fresh or cold combustion air which is indirectly heated therein by the residual gases from the furnace before being introduced through a pipe 32 into the melting furnace or its burners (not shown in detail). the recuperator 30 is also directly connected by a pipe 33 for introducing the residual gases from the furnace (without the interposition of a fan) to the fluidised-bed preheater 3 or to its pressure chamber 3b' (below the grid 23). Since the residual gases from the furnace may still be relatively hot in this case in relation to those of the example of embodiment shown in FIG. 1, it is generally recommended to line the pipe 33 for introducing the residual gases in such a way that it is heat-resistant, as partly indicated by the partly sectional illustration in FIG. 2.

In addition, to avoid overheating in the fluidised-bed preheater 3 and hence an undesirable reaction of the starting materials by the action of the excessively hot residual gases from the furnace, a corresponding fraction of these residual gases may be discharged into the atmosphere (optionally by way of a chimmney), passing through a branch pipe 34 connected to the introduction pipe 33, a fresh air intake 35 being connected to the pipe for introducing the residual gases 33 in the zone situated upstream of the fluidised-bed preheater 3 (in any case in the zone situated between the preheater 3 and the branch pipe 34), so that the residual gases from the furnace flowing towards the starting materials contained in the fluidised-bed preheater 3 may be brought to the necessary temperature by the addition and admixture of cold air.

In this case, the necessary pressure under which the residual gases from the furnace are delivered to the fluidised-bed preheater is produced by a corresponding design of the fan 36 arranged downstream of the high-performance dust remover 5.

Similarly, in this second example of embodiment, the exit of the fluidised-bed preheater 3 is formed by a discharge lock 37 which, in the same way as in the example of embodiment described above, is connected on the one hand by a connecting pipe 16 to the endless dust-collecting screw 15 of the filter 5 and, on the other hand, by the connecting pipe 11 to the intermediate reservoir 12. Since, in this example of embodiment illustrated in FIG. 2, the fluidised state of the starting materials contained in the chamber 3a of the fluidised bed is maintained by the reduced pressure generated by the fan 36, it is necessary to connect the discharge lock 37 of the fluidised bed to a separate source of compressed air. To this end, a compressed-air connecting pipe 38 is used for the discharge lock 37 of the fluidised bed and may be connected to a compressed-air source not shown in detail (for example to an existing compressed-air system or to a small additional fan).

In this example of embodiment of the invention, which is somewhat simplified in regard to its construction, there are preferably provided control instruments (not shown in detail) which act on the throttle valves 39, 39a, 39b incorporated in the pipe 33 for introducing the residual gases, in the connecting pipe 34 and in the fresh air intake 35 so that it is possible to adjust any optimum temperature of the residual gases for heating the starting materials of the preheater 3. In this way, a substantially constant temperature also prevails in the melting furnace.

While this invention has been described in detail with particular reference to preferred embodiments thereof, it will be understood that variations and modifications can be effected within the spirit and scope of the invention as described hereinbefore and as defined in the appended claims.

We claim:

1. An installation for heating starting materials intended for the melting of glass comprising a melting furnace and a preheater for the starting materials which is arranged upstream of the melting furnace and a preheater for the starting materials which is arranged upstream of the melting furnace and to which is connected a pipe for introducing the residual gases from the furnace, characterised in that a fluidised-bed preheater (3) provided with a discharge lack (10, 37) is used as the preheater for the starting materials and in that a high-performance dust remover (5), of which the dust discharge pipe (15a) is connected to the discharge lock of the fluidised bed, is connected to the residual gas pipe (6) of the fluidised-bed preheater. lock 2. An installation as claimed in claim 1 comprising a recuperator through which the residual gases of the furnace flow and which preheats the combustion air intended for the melting furnace, wherein the inlet pipe (4,33) for the residual gases of the furnace connects the fluidised-bed preheater (3) to the recuperator (2, 30).

3. An installation as claimed in claim 2, characterised in that the recuperator is designed as a recuperator (2) having two chambers (2a, 2b) of which each is traversed in an alternately periodic manner by the hot residual gases from the furnace or by the combustion air to be introduced into the melting furnace (1), a fan (22) being incorporated in the inlet pipe (4) leading to the fluidised-bed preheater (3).

4. An installation as claimed in claim 2, characterised in that the recuperator is in the form of an indirect-action tubular heat exchanger (30) which is directly connected by the inlet pipe (33) to the fluidised-bed preheater (3), this inlet pipe being provided with a heat-resistant lining.

5. An installation as claimed in any of claim 2 characterised in that the inlet pipe for the residual gases from the furnace (4,33) comprises a branch pipe (19,34) which opens into the atmosphere.

6. An installation as claimed in any of claim 2 characterised in that the pipe (33) for introducing the residual gases from the furnace is provided with a fresh air intake (35) in the zone situated upstream of the fluidised-bed preheater (3).

7. An installation as claimed in claim 5 characterised in that throttle valves (21, 21a, 39, 39a, 39b) are incorporated in the inlet pipe for the residual gases (4,33), in the branch pipe (19,34) and in the fresh air intake (35).

8. An installation as claimed in claim 1 characterised in that the fluidised-bed preheater (3) comprises only one fluidised-bed chamber (3a).

9. An installation as claimed in claim 1 characterised in that the fluidised-bed chamber (3a) and the discharge lock (10) of the fluidised-bed may be fed with residual gases emanating from the furnace.

10. An installation as claimed in claim 1 characterised in that only the fluidised-bed chamber (3a) can be fed with residual gases emanating from the furnace, whilst the discharge lock (37) of the fluidised-bed is provided with a separate pipe (38) for the introduction of compressed air.

11. An installation as claimed in claim 1, characterised in that a bag filter (5) is used as the high-performance dust remover.

12. An installation as claimed in claim 11, characterised in that the residual gas pipe (6) of the heat exchanger (3) of the fluidised-bed in provided with an adjustable cold air intake (6a).

13. An installation as claimed in claim 1, characterised in that the fluidised-bed preheater (3) comprises an entrance lock (9) for the starting materials mounted upstream of a metering unit (8) for the starting materials.

14. An installation as claimed in claim 1, characterised in that the discharge lock (10;37) of the fluidised bed is connected to the melting furnace (1) by an intermediate reservoir (12) for receiving the preheated starting materials and by a tapping unit (13) situated below the intermediate resevoir.

15. An installation for heating starting materials for the melting of glass and the like comprising a melting furnace including a heat recuperator, a preheater housing including a fluidized bed surface for moving the heat starting materials through said preheater housing, gas flow directing means for moving the residual gases from the furnace through said heat recuperator and to said preheater housing below said fluidized bed surface, a discharge air lock for exhausting the heat starting materials from said preheater housing substantially without the passage therethrough of gases from said preheater housing, materials flow directing means for moving the preheated starting materials from said discharged air lock to said melting furnace, filter means in communication with said preheater housing at a position above said fluidized bed surface, conveyor means for conveying dust from said filter means to said discharge air lock.

* * * * *